United States Patent
Wang et al.

(10) Patent No.: US 8,643,760 B2
(45) Date of Patent: Feb. 4, 2014

(54) IMAGE PROCESSING METHODS AND SYSTEMS FOR HANDHELD DEVICES

(75) Inventors: Huei-Long Wang, Taoyuan County (TW); Bing-Sheng Lin, Taoyuan County (TW); Ting-Ting Hu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 13/223,881

(22) Filed: Sep. 1, 2011

(65) Prior Publication Data

US 2012/0057063 A1    Mar. 8, 2012

(30) Foreign Application Priority Data

Sep. 2, 2010   (TW) .............................. 99129630 A

(51) Int. Cl.
*H04N 5/222*    (2006.01)

(52) U.S. Cl.
USPC ................... 348/333.11; 348/222.1; 348/239; 345/520; 345/661; 715/764

(58) Field of Classification Search
USPC ................. 348/333.11, 333.02, 239, 333.12, 348/222.1; 345/520; 715/764
See application file for complete search history.

(56) References Cited

U.S. PATENT DOCUMENTS

| | | | |
|---|---|---|---|
| 7,570,810 B2 * | 8/2009 | Rai et al. | 382/167 |
| 2003/0103234 A1 * | 6/2003 | Takabayashi et al. | 358/1.15 |
| 2006/0163450 A1 * | 7/2006 | Oyama | 250/208.1 |
| 2006/0188147 A1 * | 8/2006 | Rai et al. | 382/162 |
| 2008/0036789 A1 | 2/2008 | de Leon | |
| 2008/0129844 A1 | 6/2008 | Cusack et al. | |
| 2009/0015703 A1 * | 1/2009 | Kim et al. | 348/333.12 |
| 2010/0073303 A1 * | 3/2010 | Wu et al. | 345/173 |
| 2010/0238324 A1 * | 9/2010 | Toyoda | 348/239 |
| 2011/0193993 A1 * | 8/2011 | Yeom et al. | 348/231.3 |

FOREIGN PATENT DOCUMENTS

| | | |
|---|---|---|
| CN | 101502095 A | 8/2009 |
| CN | 101685372 A | 3/2010 |
| EP | 0 853 426 A2 | 7/1998 |
| EP | 1 526 727 A1 | 4/2005 |
| TW | 200627934 | 8/2006 |
| WO | WO 2009/089525 A1 | 7/2009 |

* cited by examiner

*Primary Examiner* — Sinh Tran
*Assistant Examiner* — Paul Berardesca
(74) *Attorney, Agent, or Firm* — Birch, Stewart, Kolasch & Birch, LLP

(57) ABSTRACT

Image processing methods and systems for handheld devices are provided. First, an image effect is determined. Then, a plurality of preview images is continuously captured by an image capture unit of an electronic device. After the respective preview image is captured, the image effect is applied to the preview image, and the preview image applied with the image effect is displayed in a display unit of the electronic device.

15 Claims, 5 Drawing Sheets

IMAGE PROCESSING METHODS AND SYSTEMS FOR HANDHELD DEVICES

CROSS REFERENCE TO RELATED APPLICATIONS

This application claims priority of Taiwan Patent Application No. 099129630, filed on Sep. 2, 2010, the entirety of which is incorporated by reference herein.

BACKGROUND OF THE INVENTION

1. Field of the Invention

The disclosure relates generally to image processing methods and systems for handheld devices, and, more particularly to methods and systems that apply image effects to preview images captured by an image capture unit of a handheld device.

2. Description of the Related Art

Recently, portable devices, such as handheld devices, have become more and more technically advanced and multifunctional. For example, a handheld device may have telecommunication capabilities, e-mail message capabilities, an advanced address book management system, a media playback system, and various other functions. Due to increased convenience and functions of the devices, these devices have become basic necessities of life.

Generally, most handheld devices may be equipped with an image capture unit for capturing images. For example, users can take photos using the camera set on the handheld device. Currently, when users want to add related image effects to the image captured by the handheld device, users must first use the handheld device to capture an image, and transmit the image from the handheld device to a computer. Then, image editing software can be operated in the computer to process the image, such that related image effects can be added to the image.

Above image processing operations for images captured by the handheld devices require related operational knowledge and many manual operations. The required operations are time-consuming and inconvenient for users.

BRIEF SUMMARY OF THE INVENTION

Image processing methods and systems for handheld devices are provided.

In an embodiment of an image processing method for handheld devices, an image effect is determined. Then, a plurality of preview images is continuously captured by an image capture unit. After the respective preview image is captured, the image effect is applied to the preview image, and the preview image applied with the image effect is displayed in a display unit.

An embodiment of an image processing system for handheld devices includes an image capture unit, a display unit and a processing unit. The image capture unit continuously captures a plurality of preview images. The processing unit determines an image effect, and the image effect is applied to the preview image after the respective preview image is captured. The processing unit displays the preview image applied with the image effect via the display unit.

In some embodiments, the display unit may be a touch-sensitive display unit. The touch-sensitive display unit can display a control interface. An operation corresponding to the control interface can be received via the touch-sensitive display unit, in which the operation is used to determine at least one effect parameter corresponding to the image effect. The processing unit applies the image effect to the preview image based on the at least one effect parameter.

In some embodiments, the control interface can include a specific region, such as a circular region. The operation corresponding to the control interface may be an adjustment for the range of the specific region via the touch-sensitive display unit, wherein the range of the specific region can be corresponded to at least one effect parameter corresponding to the image effect.

In some embodiments, the control interface can include a slide bar. The operation corresponding to the control interface may be an adjustment for the position of a control button in the slide bar via the touch-sensitive display unit, and wherein the position of the control button can be corresponded to the effect parameter corresponding to the image effect.

Image processing methods for handheld devices may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Image processing methods and systems for handheld devices are provided.

Figure 1:
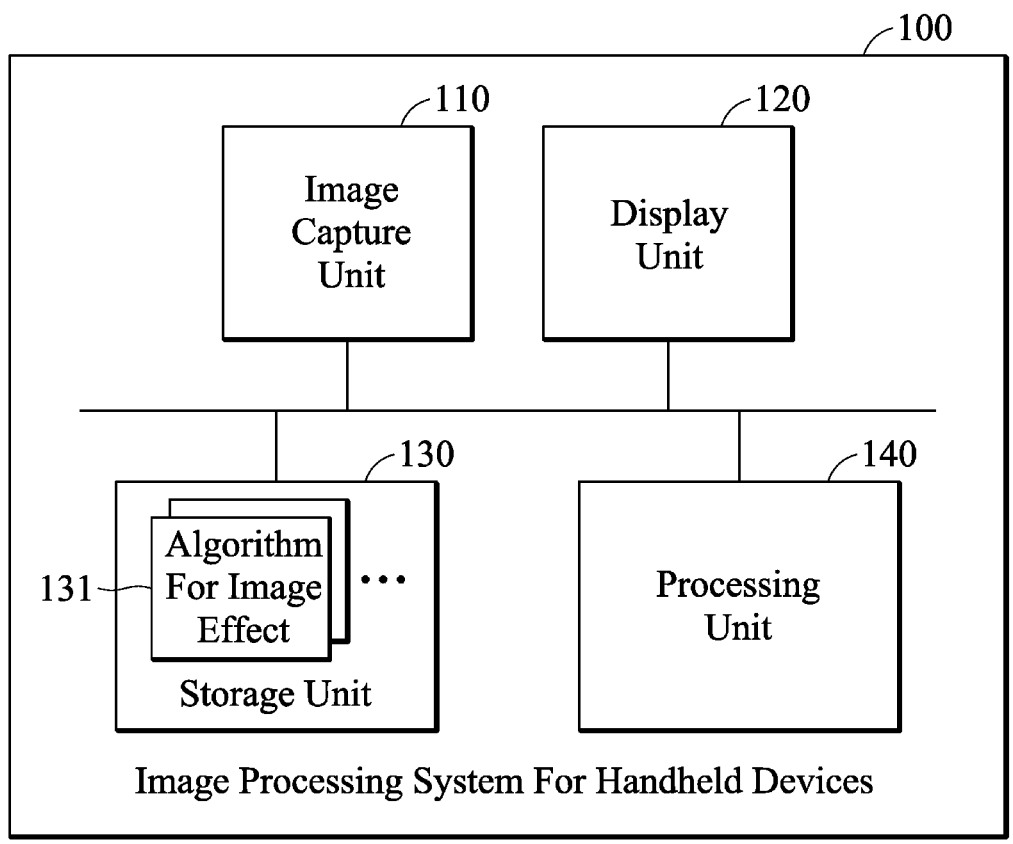
FIG. 1 is a schematic diagram illustrating an embodiment of an image processing system for handheld devices of the invention.

FIG. 1 is a schematic diagram illustrating an embodiment of an image processing system for handheld devices of the invention. The image processing system for handheld devices 100 can be used in an electronic device, such as handheld devices such as a PDA (Personal Digital Assistant), a smart phone, a mobile phone, an MID (Mobile Internet Device, MID), or a Netbook.

The image processing system for handheld devices 100 comprises an image capture unit 110, a display unit 120, a storage unit 130, and a processing unit 140. The image capture unit 110 may be a camera for continuously capturing preview images. The display unit 120 can display images captured by the image capture unit 110, related data, and/or related figures and interfaces. It is understood that, in some embodiments, the display unit 120 may be integrated with a touch-sensitive device (not shown) to form a touch-sensitive display unit. The touch-sensitive device has a touch-sensitive surface comprising sensors in at least one dimension to detect contact and movement of an input tool, such as a stylus or finger on the touch-sensitive surface. The storage unit 130 may be an internal memory or an external memory, such as a memory card of the electronic device. The storage unit 130 can record at least one algorithm 131 corresponding to at least one image effect. The image effect can comprise at least one effect parameter, which can be provided to the algorithm 131 for related calculations and processing. It is noted that, the image effects can comprise a distortion effect, a toy camera effect, a depth-of-field effect, a vignette effect, and an old film effect. It is noted that, the above image effects are examples of the present application, and the present invention is not limited thereto. The use and adjustment of the algorithm 131 of the image effect and related effect parameters will be discussed later. It is noted that, as described, the image capture unit 110 can continuously capture preview images, and the preview images can be displayed in the display unit 120. It is understood that, a preview image is an image captured by the image capture unit which is not actually stored in the storage unit 130. After an image effect is determined, the image effect will be applied to the respective preview image captured by the image capture unit 110, and the preview image with the image effect is displayed in the display unit 120. In some embodiments, the electronic device may have a physical button, or the electronic device can display a logical button in an operational interface via the display unit 120. When the physical or logical button is triggered, for example, pressed, the electronic device will receive an instruction. In response to the instruction, the preview image applied with the image effect is stored to the storage unit 130. The processing unit 140 performs the image processing methods for handheld devices of the invention, which will be discussed further in the following paragraphs.

Figure 2:
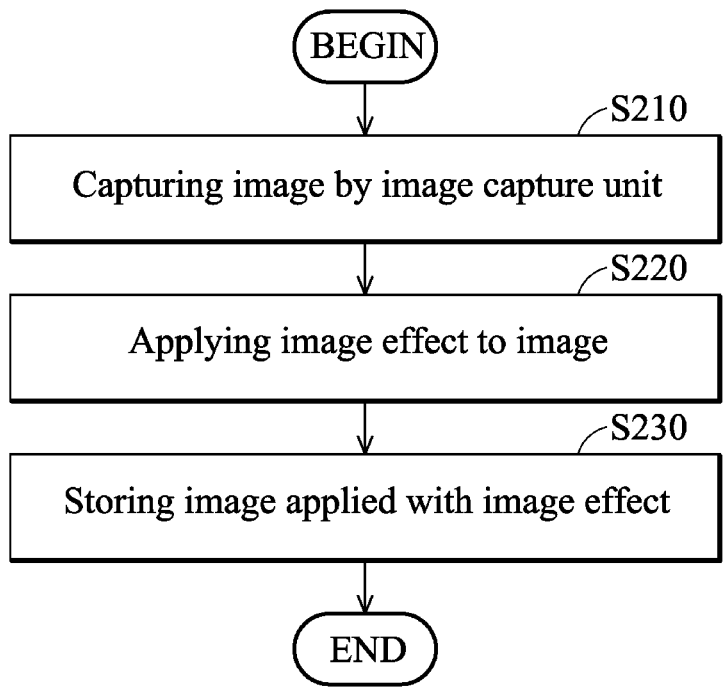
FIG. 2 is a flowchart of an embodiment of an image processing method for handheld devices of the invention.

FIG. 2 is a flowchart of an embodiment of an image processing method for handheld devices of the invention. The image processing method for handheld devices can be used in an electronic device, such as a portable device comprising handheld devices such as a PDA, a smart phone, a mobile phone, an MID, and a Netbook.

In step S210, an image is captured by the image capture unit. In step S220, an image effect is applied to the image captured by the image capture unit. It is understood that, in some embodiments, when several image effects are provided in the electronic device, the electronic device can provide an interface for users to select one of the image effects. Additionally, as described, each image effect may have a corresponding algorithm, and the image effect may have at least one effect parameter, which can be provided to the algorithm for calculation and processing. The use and adjustment of the algorithm of the image effect and related effect parameters will be discussed later. In step S230, the image with the image effect is stored to the storage unit.

Figure 3:
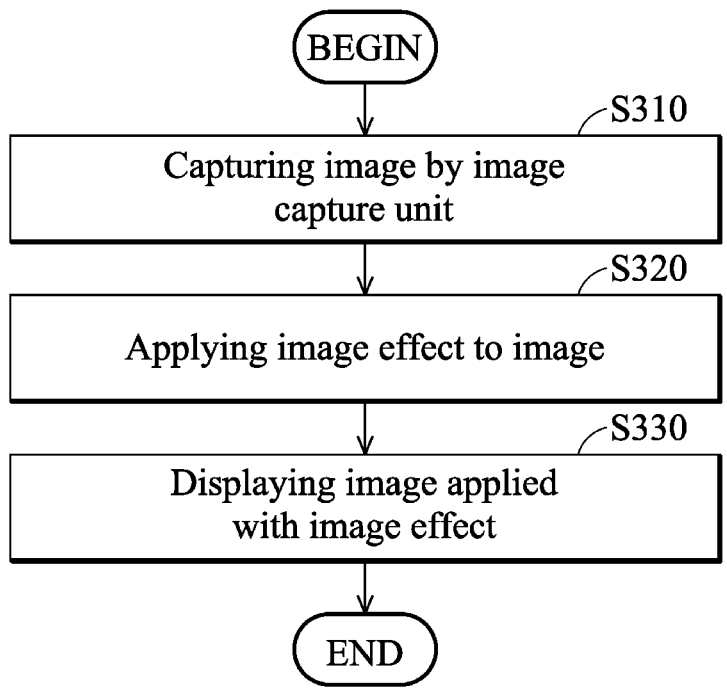
FIG. 3 is a flowchart of another embodiment of an image processing method for handheld devices of the invention.

FIG. 3 is a flowchart of another embodiment of an image processing method for handheld devices of the invention. The image processing method for handheld devices can be used in an electronic device, such as a portable device comprising handheld devices such as a PDA, a smart phone, a mobile phone, an MID, and a Netbook.

In step S310, a preview image is captured by the image capture unit. In step S320, an image effect is applied to the preview image captured by the image capture unit. Similarly, in some embodiments, when several image effects are provided in the electronic device, the electronic device can provide an interface for users to select one of the image effects. Additionally, as described, each image effect may have a corresponding algorithm, and the image effect may have at least one effect parameter, which can be provided to the algorithm for calculation and processing. The use and adjustment of the algorithm of the image effect and related effect parameters will be discussed later. In step S330, the preview image with the image effect is displayed in the display unit.

Figure 4:
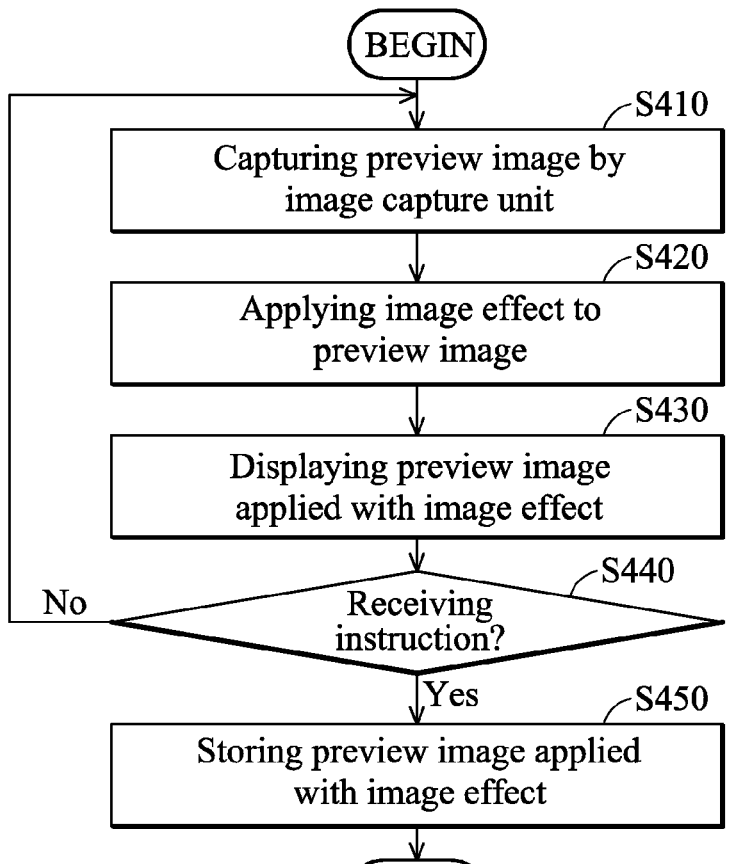
FIG. 4 is a flowchart of another embodiment of an image processing method for handheld devices of the invention.

FIG. 4 is a flowchart of another embodiment of an image processing method for handheld devices of the invention. The image processing method for handheld devices can be used in an electronic device, such as a portable device comprising handheld devices such as a PDA, a smart phone, a mobile phone, an MID, and a Netbook.

In step S410, a preview image is captured by the image capture unit. In step S420, an image effect is applied to the preview image captured by the image capture unit. Similarly, in some embodiments, when several image effects are provided in the electronic device, the electronic device can provide an interface for users to select one of the image effects. Additionally, as described, each image effect may have a corresponding algorithm, and the image effect may have at least one effect parameter, which can be provided to the algorithm for calculation and processing. The use and adjustment of the algorithm of the image effect and related effect parameters will be discussed later. In step S430, the preview image applied with the image effect is displayed in the display unit. In step S440, it is determined whether an instruction is received. Similarly, the electronic device may have a physical button, or the electronic device can display a logical button in an operational interface via the display unit. When the physical or logical button is triggered, for example, pressed, the electronic device will receive the instruction. If no instruction is received (No in step S440), the operations of steps S410 to S430 are repeated, in which the image capture unit continues to capture another preview image, the image effect is applied to the captured preview image, and the preview image applied with the image effect is displayed in the display unit. If the instruction is received (Yes in step S440), in step S450, the preview image applied with the image effect is stored to the storage unit.

Figure 5:
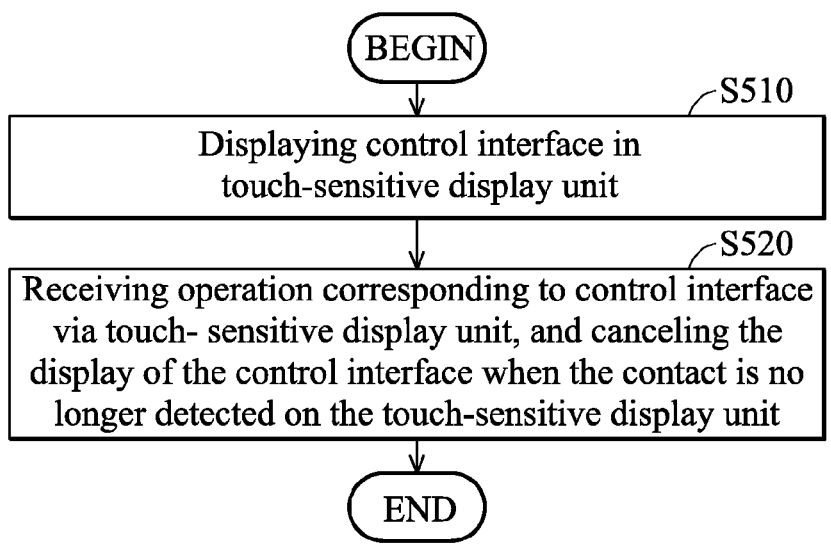
FIG. 5 is a flowchart of an embodiment of a method for adjusting image effect parameters of the invention.

FIG. 5 is a flowchart of an embodiment of a method for adjusting image effect parameters of the invention.

In step S510, a control interface is displayed in the touch-sensitive display unit. It is understood that, as described, the image effect may have at least one effect parameter, which can be provided to the algorithm for calculation and processing. The effect parameter corresponding to the image effect can be determined via the control interface. In step S520, an operation corresponding to the control interface is received via the touch-sensitive display unit, in which the operation is used to determine the effect parameter corresponding to the image effect. It is understood that, in some embodiments, it is determined whether a contact on the touch-sensitive display unit is detected or not. When a contact is detected, in response to the contact, the control interface is displayed in the touch-sensitive display unit. When the contact is no longer detected on the touch-sensitive display unit, the display of the control interface is cancelled.

Figure 6:
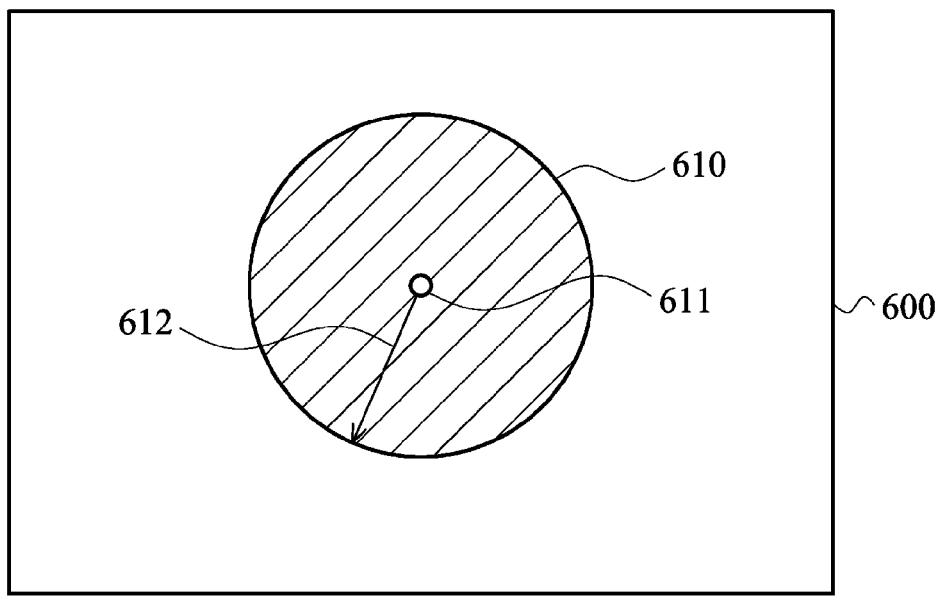
FIG. 6 is a schematic diagram illustrating an embodiment of a control interface of the invention.

FIG. 6 is a schematic diagram illustrating an embodiment of a control interface of the invention. In this embodiment, the control interface 600 includes a specific region 610. It is noted that, in this embodiment, the specific region 610 is a circular region. However, the present invention is not limited thereto. The specific region 610 has a range, and the range of the specific region 610 can be used to determine at least one effect parameter for the corresponding image effect. It is understood that, in some embodiments, the determination of the range can be performed in various manners. For example, the range can be determined by a center position, a size and/or a plurality of points. Note that the center position, the size and/or each point can respectively correspond to the effect parameter of the image effect. In the example of FIG. 6, the specific region 610 has a range determined based on a center 611 and a radius 612. That is, the range, such as position and size of the specific region 610 can be determined according to the center 611 and the radius 612. Similarly, the position and the size of the specific region 610 are respectively corresponded to different effect parameters of the image effect. Users can perform related operations to the specific region 610 via the touch-sensitive display unit. For example, users can use their fingers to directly touch and drag the position of the center 611. Users can also use their fingers to directly touch and drag the radius 612, thus to adjust (minify/magnify) the length of the radius 612. It is noted that, in some embodiments, the display unit can simultaneously display the preview image and the control interface 600, wherein the control interface 600 may be translucent and covered on the preview image. When the specific region 610 is adjusted, the electronic device can immediately or in real time, apply an image effect to the preview image according to the effect parameters determined based on the specific region 610.

Figure 7:
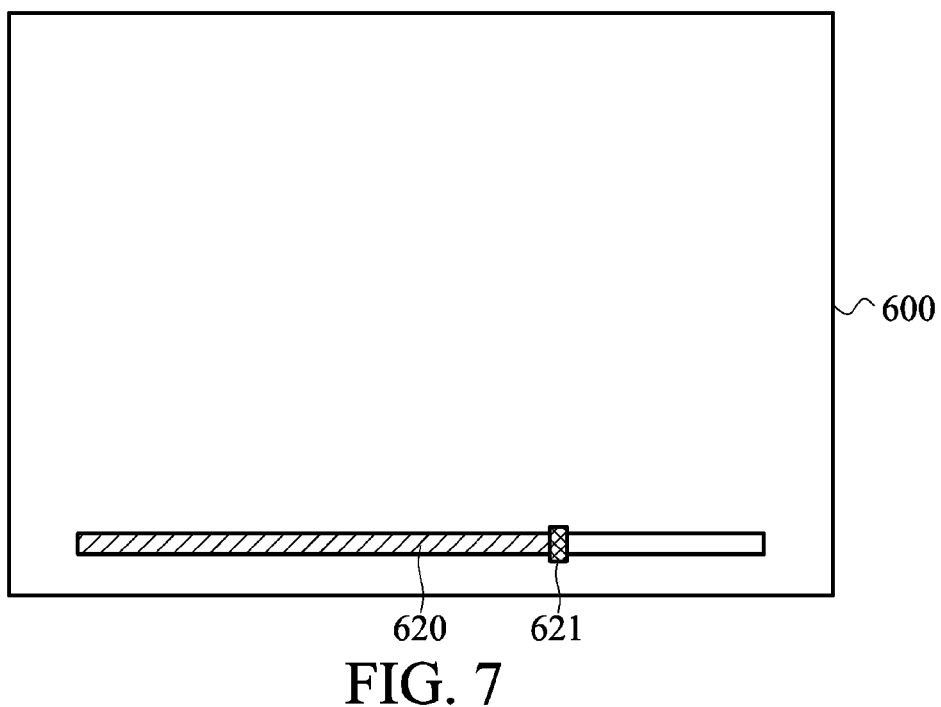
FIG. 7 is a schematic diagram illustrating another embodiment of a control interface of the invention.

FIG. 7 is a schematic diagram illustrating another embodiment of a control interface of the invention. In this embodiment, the control interface 600 includes a slide bar 620 having a control button 621. It is noted that, in this embodiment, the slide bar 620 is set horizontally. However, the present invention is not limited thereto. For example, the slide bar 620 can be vertically set or set askew at any position of the control interface 600. The position of the control button 621 can be corresponded to the effect parameter of the image effect. Users can perform related operations to the control button 621 via the touch-sensitive display unit. For example, users can use their fingers to directly touch and drag the position of the control button 621. Similarly, in some embodiments, the display unit can simultaneously display the preview image and the control interface 600, wherein the control interface 600 may be translucent and covered on the preview image. When the position of the control button 621 is adjusted, the electronic device can immediately or in real time, apply an image effect to the preview image according to the effect parameters determined based on the position of the control button 621.

Figure 8:
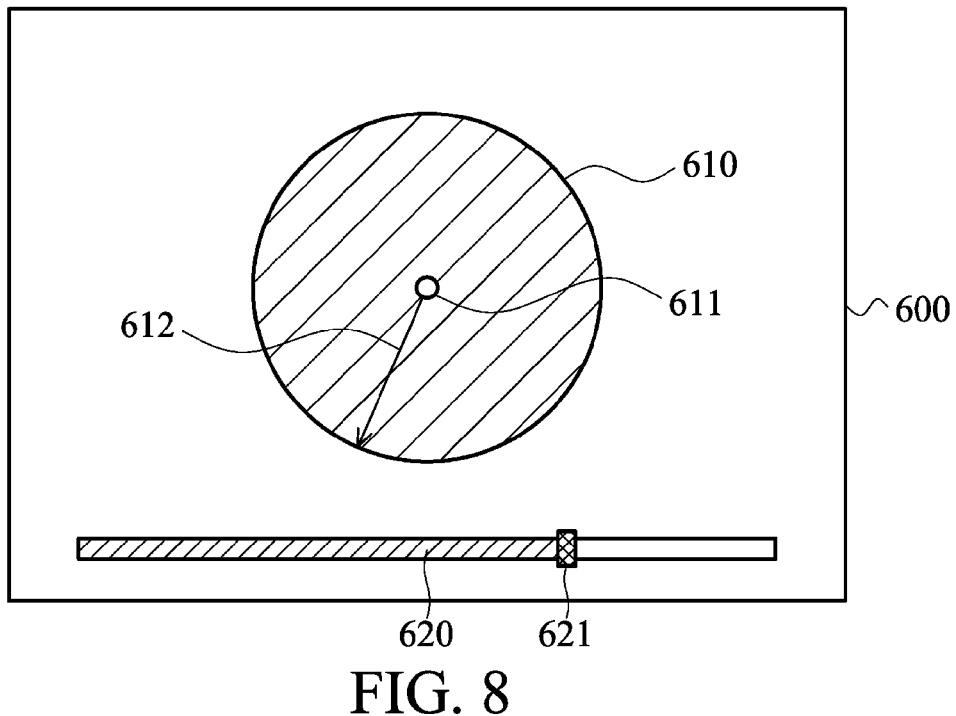
FIG. 8 is a schematic diagram illustrating another embodiment of a control interface of the invention.
Figure 9:
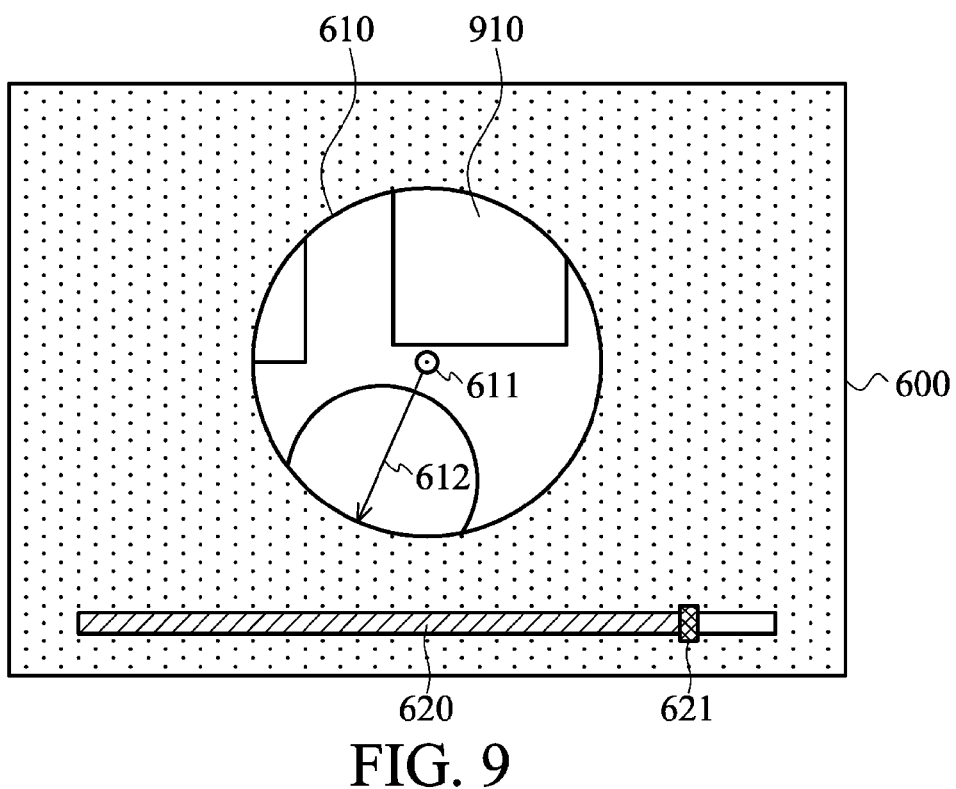
FIG. 9 is a schematic diagram illustrating an embodiment of an example of a picture of the invention.

FIG. 8 is a schematic diagram illustrating another embodiment of a control interface of the invention. In this embodiment, the control interface includes both the specific region 610 and the slide bar 620. Similarly, the specific region 610 has a range, and the range of the specific region 610 can be used to determine at least one effect parameter for the corresponding image effect. The determination of the range can be performed in various manners. For example, the range can be determined by a center position, a size and/or a plurality of points. Note that the center position, the size and/or each point can respectively correspond to the effect parameter of the image effect. In the example of FIG. 8, the specific region 610 has a range determined based on a center 611 and a radius 612. The center 611 and the radius 612 of the specific region 610 and the control button 621 in the slide bar 620 can be respectively corresponded to different effect parameters of the image effect. The operation manners of the specific region 610 and the slide bar 620 are similar to that discussed in FIGS. 6 and 7, and are omitted hereafter. Similarly, in some embodiments, the display unit can simultaneously display the preview image and the control interface 600, wherein the control interface 600 may be translucent and covered on the preview image. When the specific region 610 and/or the position of the control button 621 are adjusted, the electronic device can immediately or in real time apply, an image effect to the preview image according to the effect parameters determined based on the specific region 610 and the position of the control button 621. For example, the control interface 600 may be translucent and covered on the preview image 910, as shown in FIG. 9. When the center 611 and the radius 612 of the specific region 610 and/or the position of the control button 621 are adjusted, the electronic device can immediately or in real time apply an image effect to the preview image 910 according to the effect parameters determined based on the specific region 610 and the position of the control button 621. It is noted that, in the example, the part of the preview image 910 outside of the specific region 610 is masked, in which the position of the control button 621 can determine the mask level, such as transparency of the preview image.

It is noted that, as described, the image effects can comprise a distortion effect, a toy camera effect, a depth-of-field effect, a vignette effect, and an old film effect. When the image effect is the distortion effect, the image within the range of the specific region will be distorted, and the position of the control button in the slide bar can determine the distortion level of the image. As described, during the capture of a preview image, the range of the specific region can be adjusted. When the range of the specific region is adjusted, the image within the new range of the specific region will be distorted. When the image effect is the toy camera effect, the slide bar has a predefined number of specific positions, and the control button can be at one of the specific positions, wherein the respective specific positions can be corresponded to different toy effects. For example, when the slide bar has 3 specific positions, the first specific position may be corresponded to a cross effect, the second specific position may be corresponded to a high-contrast effect, and the third specific position may be corresponded to a warm-tone effect. When the image effect is the depth-of-field effect, the image outside of the range of the specific region will be blurred, and the position of the control button in the slide bar can determine the blur level of the image. Similarly, when the range of the specific region is adjusted, the image outside of the new range of the specific region will be blurred. When the image effect is the vignette effect, the image outside of the range of the specific region will be dark, and the position of the control button in the slide bar can determine the dark gradient for the edge of the specific region. For example, when the control button is at the leftmost position of the slide bar, the dark gradient is gradual, and when the control button is at the rightmost position of the slide bar, the dark gradient is steep. Similarly, when the range of the specific region is adjusted, the image outside of the new range of the specific region will be dark. It is understood that, when the image effect is the old film effect, without any control interface, the whole image will have an old style.

Therefore, the image processing methods and systems for handheld devices can apply image effects to the images captured by the image capture unit in the handheld devices, thus increasing convenience and efficiency of image editing and processing. With the convenience and efficiency of image editing and processing increased, related system resources of electronic devices, required for handling complicated operation by users, can be substantially reduced.

Image processing methods for handheld devices, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An image processing method for handheld devices, for use in an electronic device, comprising:
   determining an image effect;
   continuously capturing a plurality of preview images by an image capture unit;
   after the plurality of preview images are captured, respectively, applying the image effect to each of the plurality of preview images;
   displaying each of the plurality of preview images applied with the image effect in a display unit, wherein the display unit is a touch-sensitive display unit;
   displaying a control interface in the touch-sensitive display unit;
   receiving an operation corresponding to the control interface via the touch-sensitive display unit, in which the operation is used to determine at least one effect parameter corresponding to the image effect; and
   applying the image effect to each of the plurality of preview images based on the at least one effect parameter,
   wherein the control interface comprises a specific region having a range covered on the plurality of preview images, and wherein the range is corresponded to the at least one effect parameter corresponding to the image effect for determining an area of the covered one of the plurality of preview images.

2. The method of claim 1, further comprising:
   receiving an instruction; and
   in response to the instruction, storing a current preview image among the plurality of preview images with the image effect.

3. The method of claim 2, further comprising receiving a trigger corresponding to a physical button on the electronic device or a trigger corresponding to a logical button displayed in an operational interface, so as to receive the instruction.

4. The method of claim 1, further comprising:
   detecting a contact on the touch-sensitive display unit;
   in response to the contact, displaying the control interface in the touch-sensitive display unit; and
   when the contact is no longer detected on the touch-sensitive display unit, canceling the display of the control interface.

5. The method of claim 1, wherein the range is determined according to a position, a size, or a plurality of points, and wherein the position, the size, or the points are respectively corresponded to the at least one effect parameter corresponding to the image effect.

6. The method of claim 1, wherein the specific region is a circular region.

7. The method of claim 1, wherein the control interface comprises a slide bar, and the operation corresponding to the control interface is an adjustment for a position of a control button in the slide bar via the touch-sensitive display unit, and wherein the position of the control button is corresponded to the at least one effect parameter corresponding to the image effect.

8. An image processing system for handheld devices, for use in an electronic device, comprising:
   an image capture unit continuously capturing a plurality of preview images;
   a display unit; and
   a processing unit configured to determine an image effect, after the plurality of preview images are captured, respectively, apply the image effect to each of the plurality of preview images, and display each of the plurality of preview images applied with the image effect via the display unit,
   wherein the display unit is a touch-sensitive display unit, and the processing unit is configured to further display a control interface via the touch-sensitive display unit, receive an operation corresponding to the control interface via the touch-sensitive display unit, in which the operation is used to determine at least one effect parameter corresponding to the image effect, and apply the image effect to each of the plurality of preview images based on the at least one effect parameter,
   wherein the control interface comprises a specific region having a range covered on the plurality of preview images, and
   wherein the range is corresponded to the at least one effect parameter corresponding to the image effect for determining an area of the covered one of the plurality of preview images.

9. The system of claim 8, further comprising a storage unit, and the processing unit further receives an instruction, and in response to the instruction, stores a current preview image among the plurality of preview images with the image effect to the storage unit.

10. The system of claim 9, wherein the processing unit further receives a trigger corresponding to a physical button on the electronic device or a trigger corresponding to a logical button displayed in an operational interface, so as to receive the instruction.

11. The system of claim 8, wherein the processing unit further detects a contact on the touch-sensitive display unit, and in response to the contact, displays the control interface in the touch-sensitive display unit, and when the contact is no longer detected on the touch-sensitive display unit, cancels the display of the control interface.

12. The system of claim 8, wherein the range is determined according to a position, a size, or a plurality of points, and wherein the position, the size, or the points are respectively corresponded to the at least one effect parameter corresponding to the image effect.

13. The system of claim 8, wherein the specific region is a circular region.

14. The system of claim 8, wherein the control interface comprises a slide bar, and the operation corresponding to the control interface is an adjustment for a position of a control button in the slide bar via the touch-sensitive display unit, and wherein the position of the control button is corresponded to the at least one effect parameter corresponding to the image effect.

15. A non-transitory machine-readable storage medium comprising a computer program, which, when executed, causes a device to perforin an image processing method for handheld devices, wherein the method comprises:
- determining an image effect;
- continuously capturing a plurality of preview images by an image capture unit;
- after the plurality of preview images are captured, respectively, applying the image effect to each of the plurality of preview images;
- displaying each of the plurality of preview images applied with the image effect in a display unit, wherein the display unit is a touch-sensitive display unit;
- displaying a control interface in the touch-sensitive display unit;
- receiving an operation corresponding to the control interface via the touch-sensitive display unit, in which the operation is used to determine at least one effect parameter corresponding to the image effect; and
- applying the image effect to each of the plurality of preview images based on the at least one effect parameter,
- wherein the control interface comprises a specific region having a range, wherein the control interface comprises a specific region having a range covered on the plurality of preview images, and
- wherein the range is corresponded to the at least one effect parameter corresponding to the image effect for determining an area of the covered one of the plurality of preview images.

* * * * *